United States Patent Office 3,275,622
Patented Sept. 27, 1966

3,275,622
19-ALKYLIDENE-Δ⁴-3,20-KETO PREGNANES
Albert Bowers, Mexico City, Mexico, assignor to Syntex Corporation, Panama, Panama, a corporation of Panama
No Drawing. Filed Dec. 18, 1963, Ser. No. 331,386
40 Claims. (Cl. 260—239.55)

The present application is a continuation-in-part of my U.S. patent applications Serial Nos. 208,603, filed July 9, 1962, and 262,238, filed March 1, 1963, both now abandoned.

The present invention relates to novel cyclopentanophenanthrene derivatives and to a process for the production thereof.

More particularly, the present invention relates to novel 19-methylene-Δ⁴-pregnene-3,20-dione derivatives to novel 19-methylene derivatives of cortical hormones, and to the corresponding 10α-derivatives thereof.

The novel compounds of the present invention are represented by the following formulae:

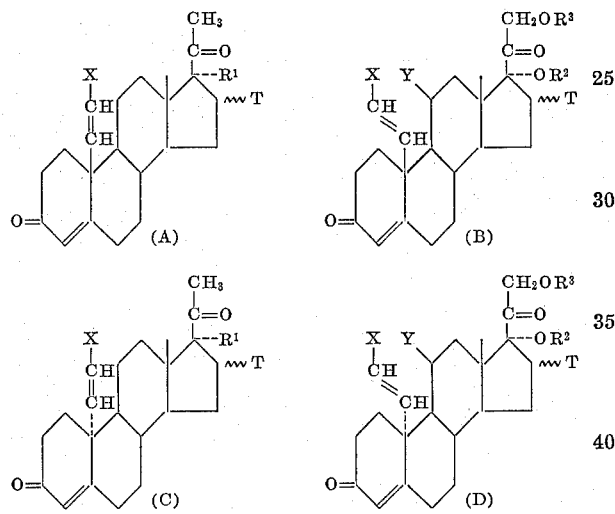

In the above formulae $R^1$ represents hydrogen, hydroxyl or a hydrocarbon carboxylic acyloxy group of less than 12 carbon atoms; T represents hydrogen, α-hydroxy, α-acyloxy, α-methyl or β-methyl; T and $R^1$ together represent the group

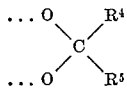

at the 16α,17α-position wherein $R^4$ and $R^5$ each represents hydrogen or a lower hydrocarbon residue of up to 8 carbon atoms, which may be saturated or unsaturated, of straight, branched, cyclic or cyclic-aliphatic chain, or aromatic, such as methyl, ethyl, isopropyl, phenyl, toluyl, methylcyclohexyl and the like; $R^2$ is hydrogen; $OR^2$ and T together represent the group

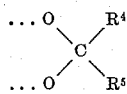

wherein $R^4$ and $R^5$ have the same meaning as defined hereinbefore; $R^3$ represents hydrogen or a hydrocarbon carboxylic acyl group of less than 12 carbon atoms; Y represents a keto group or a β-hydroxyl; and X represents hydrogen or a lower alkyl group.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by Formulae A and C are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The compounds represented by Formulae B and D are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders, such as psoriasis, allergic dermatitis and the like.

The novel compounds of the present invention are prepared by the process illustrated by the following formula scheme:

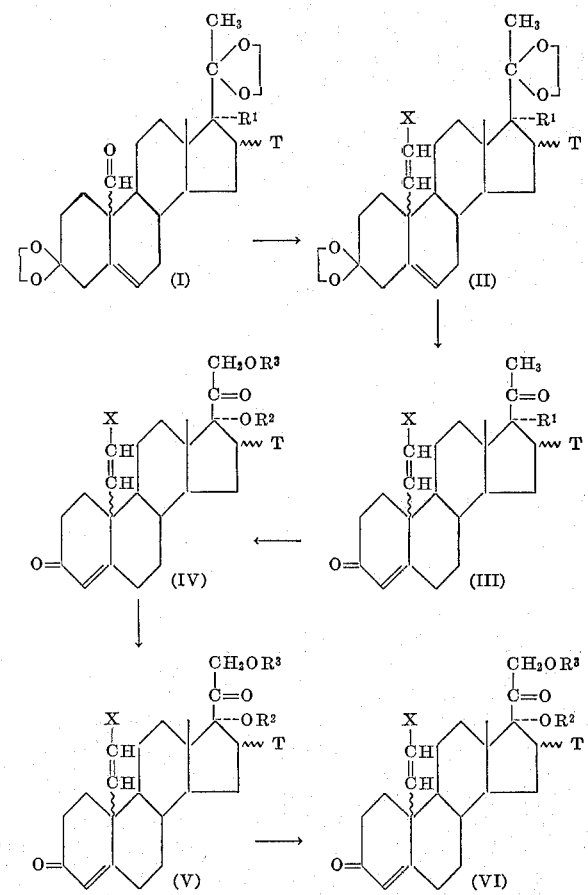

In the above formulae $R^1$, $R^2$, $R^3$, T and X have the same meaning as set forth hereinbefore; ⁁ indicates that C–19 may have α or β configuration.

In proceeding in accordance with the above scheme, the starting compound (I), which is a 3,20-biscycloethylenedioxy-Δ⁵-pregnen-19-al or the 10α-derivative thereof is treated with triphenylphosphonium lower alkyl bromide such as triphenylphosphonium methyl or ethyl bromide, in the presence of butyl lithium in a solvent inert to the reagents, such as ether, under anhydrous conditions, thus affording the corresponding 3,20-bis-cycloethylenedioxy-19-methylene-$\Delta^5$-pregnene derivative (II). The cycloethylenedioxy groupings of the latter compound are conventionally hydrolyzed in an acid medium to produce the corresponding 19-methylene-$\Delta^4$-pregnene-3,20-dione derivatives (III). The 19-methylene-$\Delta^4$-pregnene-3,20-dione derivatives having an hydroxyl at C–17$\alpha$ (II: $R^1 \neq H$), are treated with iodine, in the presence of calcium oxide, to give the corresponding 21-iodo derivatives, which upon reaction with potassium acetate in a suitable solvent, such as acetone, under anhydrous conditions, yield the corresponding 19-methylene-$\Delta^4$-pregnen-21-ol-3,20-dione acetate (IV). The latter 21-acetoxy compounds upon incubation with adrenal glands in a suitable medium, e.g. an aqueous solution of alkali metal phosphates and chlorides and magnesium sulfate, mixed with an aqueous solution of fumaric acid and sodium hydroxide for a period of time of the order of 3 hours, at approximately 30° C., followed by conventional acetylation in pyridine with acetic anhydride, yield the corresponding 21-acetoxy-11$\beta$-hydroxy-19-methylene derivatives (V), which upon oxidation, preferably with Jones' reagent, afford the corresponding 11-keto derivatives (VI).

The compounds of the present invention having a 16$\alpha$,17$\alpha$-ketonide grouping, yield the corresponding 16$\alpha$,17$\alpha$-diols by conventional treatment with a strong acid, such as formic acid. The obtained diols, upon conventional esterification in pyridine with an acylating agent, as for example acetic anhydride or caproic anhydride, afford the corresponding 16-acylates.

The latter 16$\alpha$,17$\alpha$-diols upon conventional condensation with a ketone or aldehyde, such as benzaldehyde, acetophenone, methyl-ethyl ketone, acetone, and the like, in the presence of an acid, yield the corresponding 16$\alpha$,17$\alpha$-methylenedioxy derivatives, wherein the substituent in the methylenedioxy group may be different from those of the previously hydrolyzed ketonide grouping.

The compounds of the present invention having a 21-acyloxy group, are saponified by conventional treatment with a base to produce the corresponding 21-free alcohols which in turn may be acylated conventionally in pyridine with an acylating agent to give the corresponding 21-acylates, wherein the acyl group may be different from the previously saponified one.

The compounds of the present invention having a 17$\alpha$-hydroxy group are esterified conventionally in the presence of p-toluenesulfonic acid with an acylating agent, such as acetic anhydride, thus affording the corresponding 17$\alpha$-acyloxy derivatives.

The following specific examples serve to illustrate but are not intended to limit the scope of the present invention:

PREPARATION 1

A mixture of 5 g. of $\Delta^4$-10$\alpha$-pregnen-19-ol-3,20-dione (obtained according to Cross U.S. patent application Ser. No. 231,831, filed Oct. 19, 1962, now Patent No. 3,206,459), from the corresponding $\Delta^4$-pregnen-19-ol-3,20-dione, by hydrogenation of the $\Delta^4$-double bond, tosylation of the resulting allopregnan-19-ol-3,20-dione, treatment of the obtained 19-tosylate with sodium hydride, hydrolysis of the resulting 2,19-cycloallopregnane-3,20-dione in a strong acid or basic medium and finally introduction of a $\Delta^4$-double bond into the obtained 10$\alpha$-allopregnan-19-ol-3,20-dione by conventional procedures, i.e. successive treatment with bromine, sodium iodide and $\gamma$-collidine, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-bis-cycloethylenedioxy-$\Delta^5$-10$\alpha$-pregnen-19-ol.

A solution of 6 g. of the latter compound in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3,20-biscycloethylenedioxy-$\Delta^5$-10$\alpha$-pregnen-19-al.

By the same procedures, the starting compounds listed below under A, obtained according to the aforesaid patent application, were respectively converted into the products set forth hereinafter under B:

| A | B |
|---|---|
| 16$\alpha$-methyl-$\Delta^4$-10$\alpha$-pregnen-19-al-3,20-dione. | 3,20-bis-cycloethylenedioxy 16$\alpha$-methyl-$\Delta^5$-10$\alpha$-pregnen-19-al. |
| 16$\beta$-methyl-$\Delta^4$-10$\alpha$-pregnen-19-al-3,20-dione. | 3,20-bis-cycloethylene-dioxy-16$\beta$-methyl-$\Delta^5$-10$\alpha$-pregnen-19-al. |
| 16$\alpha$,17$\alpha$-isopropylidene-dioxy-$\Delta^4$-10$\alpha$-pregnen-19-al-3,20-dione. | 3,20-bis-cycloethylene-dioxy-16$\alpha$-17$\alpha$-isopropylidenedioxy-$\Delta^5$-10$\alpha$-pregnen-19-al. |
| $\Delta^4$-10$\alpha$-pregnene-17$\alpha$,19-diol-3,20-dione. | 3,20-bis-cycloethylene-dioxy-$\Delta^5$-10$\alpha$-pregnen-17$\alpha$-ol-19-al. |
| 16$\alpha$-methyl-$\Delta^4$-10$\alpha$-pregnene-17$\alpha$,19-diol-3,20-dione. | 3,20-bis-cycloethylene-dioxy-16$\alpha$-methyl-$\Delta^5$-10$\alpha$-pregnen-17$\alpha$-ol-19-al. |
| 16$\beta$-methyl-$\Delta^4$-10$\alpha$-pregnene-17$\alpha$,19-diol-3,20-dione. | 3,20-bis-cycloethylene-dioxy-16$\beta$-methyl-$\Delta^5$-10$\alpha$-pregnen-17$\alpha$-ol-19-al. |

PREPARATION 2

A solution of 0.17 g. of potassium hydroxide in 0.2 cc. of water and 2.5 cc. of methanol was added over 30 minutes to a boiling solution of 1 g. of 3,20-bis-cycloethylenedioxy-$\Delta^5$-pregnen-17$\alpha$-ol-19-al 17 acetate (obtained in accordance with my copending U.S. patent application Ser. No. 201,797, filed June 12, 1962, now abandoned, by subjecting $\Delta^5$-pregnene-3$\beta$,17$\alpha$,19-triol-20-one 17-acetate, described in my U.S. Pat. No. 3,065,228 to oxidation under Oppenauer conditions to produce $\Delta^4$-pregnene-17$\alpha$,19-diol-3,20-dione 17-acetate, which is then reacted with ethyleneglycol in the presence of p-toluenesulfonic acid to form the 3,20-bis-cycloethylenedioxy-$\Delta^5$-pregnen-17$\alpha$,19-diol 17-acetate compound followed by oxidation with chromium trioxide) in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitate solid from acetonehexane, produced 3,20-bis-cycloethylenedioxy-$\Delta^5$-pregnen-17$\alpha$-ol-19-al.

Following the same procedure there were treated: 3,20-bis-cycloethylenedioxy - 16$\alpha$ - methyl-$\Delta^5$-pregnen-17$\alpha$-ol-19-al 17-acetate and 3,20-bis-cycloethylenedioxy-16$\beta$-methyl-$\Delta^5$-pregnen-17$\alpha$-ol-19-al 17-acetate, (obtained in accordance with the aforesaid patent application), thus yielding respectively: 3,20-bis-cycloethylenedioxy-16$\alpha$-methyl-$\Delta^5$-pregnen-17$\alpha$-ol-19-al and 3,20-bis-cycloethylenedioxy-16$\beta$-methyl-$\Delta^5$-pregnen-17$\alpha$-ol-19-al.

*Example I*

A suspension of 14.5 g. of triphenylphosphonium methyl bromide in 250 cc. of anhydrous ether was treated: under an atmosphere of nitrogen, with 40 cc. of a 1 N ethereal solution of butyl lithium and the mixture was stirred for 2 hours at room temperature. A solution of 5 g. of 3,20-bis-cycloethylenedioxy-$\Delta^5$-pregnen-19-al (U.S. Patent application v. supra) in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave 3,20 - bis-cycloethylenedioxy-19-methylene-$\Delta^5$-pregnene (compound No. 1).

The starting compounds listed under I (which were obtained in accordance either with the aforesaid U.S. patent application or with Preparation 2) were treated by the same procedure thus affording the corresponding products set forth under II.

| I | Compound No. | II |
|---|---|---|
| ,20-bis-cycloethylenedioxy-16α-methyl-$\Delta^5$-pregnen-19-al. | 2 | 3,20-bis-cycloethylenedioxy-19-methylene-16α-methyl-$\Delta^5$-pregnene. |
| 3,20-bis-cycloethylenedioxy-16β-methyl-$\Delta^5$-pregnen-19-al. | 3 | 3,20-bis-cycloethylenedioxy-19-methylene-16β-methyl-$\Delta^5$-pregnene. |
| ,20-bis-cycloethylenedioxy-16α,17α-isopropylidenedioxy-$\Delta^5$-pregnen-19-al. | 4 | 3,20-bis-cycloethylenedioxy-19-methylene-16α-17α-isopropylidenedioxy-$\Delta^5$-pregnene. |
| ,20-bis-cycloethylenedioxy-$\Delta^5$-pregnen-17α-ol-19-al. | 5 | 3,20-bis-cycloethylenedioxy-19-methylene-$\Delta^5$-pregnen-17α-ol. |
| 3,20-bis-cycloethylenedioxy-16α-methyl-$\Delta^5$-pregnen-17α-ol-19-al. | 6 | 3,20-bis-cycloethylenedioxy-19-methylene-16α-methyl-$\Delta^5$-pregnen-17α-ol. |
| 3,20-bis-cycloethylenedioxy-16β-methyl-$\Delta^5$-pregnen-17α-ol-19-al. | 7 | 3,20-bis-cycloethylenedioxy-19-methylene-16β-methyl-$\Delta$-pregnen-17α-ol. |

*Example II*

The starting compounds of Example I were treated in accordance with the procedure described in that example, except that triphenylphosphonium methyl bromide was substituted by triphenylphosphonium ethyl bromide thus giving respectively the following final products Cpd. No.:
 8. 3,20-bis-cycloethylenedioxy-19-ethylidene-$\Delta^5$-pregnene,
 9. 3,20-bis-cycloethylenedioxy-19-ethylidene-16α-methyl-$\Delta^5$-pregnene,
 10. 3,20-bis-cycloethylenedioxy-19-ethylidene-16β-methyl-$\Delta^5$-pregnene,
 11. 3,20-bis-cycloethylenedioxy-19-ethylidene-16α,17α-isopropylidenedioxy-$\Delta^5$-pregnene,
 12. 3,20-bis-cycloethylenedioxy-19-ethylidene-$\Delta^5$-pregnen-17α-ol,
 13. 3,20-bis-cycloethylenedioxy-19-ethylidene-16α-methyl-$\Delta^5$-pregnen-17α-ol,
 14. 3,20-bis-cycloethylenedioxy-19-ethylidene-16β-methyl-$\Delta^5$-pregnen-17α-ol.

*Example III*

A solution of 5 g. of compound No. 1 in 250 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methylene-$\Delta^4$-pregnene-3,20-diode (Cpd. No. 15).

The compounds Nos. 2 to 14, inclusive, were treated by the same procedure, thus affording respectively Cpd. No.:
 16. 19-methylene-16α-methyl-$\Delta^4$-pregnene-3,20-dione,
 17. 19-methylene-16β-methyl-$\Delta^4$-pregnene-3,20-dione,
 18. 19-methylene-16α-17α-isopropylidenedioxy-$\Delta^4$-pregnene-3,20-dione,
 19. 19-methylene-$\Delta^4$-pregnen-17α-ol-3,20-dione,
 20. 19-methylene-16α-methyl-$\Delta^4$-pregnen-17α-ol-3,20-dione,
 21. 19-methylene-16β-methyl-$\Delta^4$-pregnen-17α-ol-3,20-dione,
 22. 19-ethylidene-$\Delta^4$-pregnene-3,20-dione,
 23. 19-ethylidene-16α-methyl-$\Delta^4$-pregnene-3,20-dione,
 24. 19-ethylidene-16β-methyl-$\Delta^4$-pregnene-3,20-dione,
 25. 19-ethylidine-16α,17α-isopropylidenedioxy-$\Delta^4$-pregnene-3,20-dione,
 26. 19-ethylidene-$\Delta^4$-pregnen-17α-ol-3,20-dione.
 27. 19-ethylidene-16α-methyl-$\Delta^4$-pregnen-17α-ol-3,20-dione,
 28. 19-ethylidene-16β-methyl-$\Delta^4$-pregnen-17α-ol-3,20-dione.

*Example IV*

A cooled solution of 4 g. of 19-methylene-16α,17α-isopropylidenedioxy-$\Delta^4$-pregnene-3,20-dione (Cpd. No. 18) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative.

This compound was mixed with 80 cc. of acetone and 12 g. of recently fused potassium acetate and the mixture was refluxed for 8 hours, concentrated to a small volume, diluted with water and extracted with ethyl acetate the extract was washed with water, dried over anhydrous sodium sulfate and concentrated until crystallization started. The precipitate was collected and crystallized from methanol-water, thus yielding 19-methylene-16α,17α-isopropylidenedioxy-$\Delta^4$-pregnen-21-ol-3,20-dione acetate (Cpd. No. 29).

The compounds Nos. 19, 20, 21, 25, 26, 27 and 28 were treated by the same procedure, thus affording respectively Cpd. No.:
 30. 19-methylene-$\Delta^4$-pregnene-17α,21-diol-3,20-dione 21-acetate,
 31. 19-methylene-16α-methyl-$\Delta^4$-pregnene-17α,21-diol-3,20-dione 21-acetate,
 32. 19-methylene-16β-methyl-$\Delta^4$-pregnene-17α,21-diol-3,20-dione 21-acetate,
 33. 19-ethylidene-16α-17α-isopropylidenedioxy-$\Delta^4$-pregnen-21-ol-3,20-dione acetate,
 34. 19-ethylidene-$\Delta^4$-pregnene-17α,21-diol-3,20-dione-21-acetate
 35. 19-ethylidene-16α-methyl-$\Delta^4$-pregnene-17α,21-diol-3,20-dione 21-acetate,
 36. 19-ethylidene-16β-methyl-$\Delta^4$-pregnene-17α,21-diol-3,20-dione 21-acetate.

*Example V*

The following solutions "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 10.1% magnesium sulfate, to a volume of 5 lt. solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solutions with vigorous stirring. To the mixture there was then added 1 g. of compound No. 29, dissolved in 5.35 cc. of propyleneglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 19 - methylene-16α,17α-isopropylidenedioxy-Δ$^4$-pregnene-11β,21-diol-3,20-dione 21-acetate (Cpd. No. 37).

The compounds Nos. 30 to 36, inclusive, were treated under the same conditions, thus yielding respectively Cpd. No:
- 38. 19-methylene-Δ$^4$-pregnene-11β,17α,21-triol-3,20-dione 21-acetate,
- 39. 19-methylene-16α-methyl-Δ$^4$-pregnene-11β,17α,21-triol-3,20-dione 21-acetate,
- 40. 19-methylene-16β-methyl-Δ$^4$-pregnene-11β,17α,21-triol-3,20-dione 21-acetate,
- 41. 19-ethylidene-16α,17α-isopropylidenedioxy-Δ$^4$-pregnene-11β,21-diol-3,20-dione 21-acetate,
- 42. 19-ethylidene-Δ$^4$-pregnene-11β,17α,21-triol-3,20-dione 21-acetate,
- 43. 19-ethylidene-16α-methyl-Δ$^4$-pregnene-11β,17α,21-triol-3,20-dione 21-acetate,
- 44. 19-ethylidene-16β-methyl-Δ$^4$-pregnene-11β,17α,21-triol-3,20-dione 21-acetate.

*Example VI*

A solution of 1 g. of compound No. 37 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19-methylene-16α,17α-isopropylidenedioxy - Δ$^4$ - pregnen-21-ol-3,11,20-trione acetate (Cpd. No. 45).

The compounds Nos. 38 to 44, inclusive, were treated by the same procedure, affording respectively Cpd. No:
- 46. 19-methylene-Δ$^4$-pregnene-17α,21-diol-3,11,20-trione 21-acetate,
- 47. 19-methylene-16α-methyl-Δ$^4$-pregnene-17α,21-diol-3,11,20-trione 21-acetate,
- 48. 19-methylene-16β-methyl-Δ$^4$-pregnene-17α,21-diol-3,11,20-trione 21-acetate,
- 49. 19-ethylidene-16α,17α-isopropylidenedioxy-Δ$^4$-pregnen-21-ol-3,11,20-trione acetate,
- 50. 19-ethylidene-Δ$^4$-pregnene-17α,21-diol-3,11,20-trione 21-acetate,
- 51. 19-ethylidene-16α-methyl-Δ$^4$-pregnene-17α,21-diol-3,11,20-trione 21-acetate,
- 52. 19-ethylidene-16β-methyl-Δ$^4$-pregnene-17α,21-diol-3,11,20-trione 21-acetate.

*Example VII*

A suspension of 1 g. of 19-methylene-16α,17α-isopropylidenedioxy - Δ$^4$ - pregnene-11β,21-diol-3,20-dione 21-acetate (Cpd. No. 37) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19-methylene-16α,17α-isopropylidenedioxy-Δ$^4$-pregnene-11β,21-diol-3,20-dione (Cpd. No. 53).

Following the same procedure there were treated the compounds Nos. 38 to 52 inclusive, thus furnishing respectively Cpd. No.:
- 54. 19-methylene-Δ$^4$-pregnene-11β,17α,21 - triol - 3,20-dione,
- 55. 19-methylene-16α-methyl-Δ$^4$-pregnene - 11β,17α,21-triol-3,20-dione,
- 56. 19-methylene-16β-methyl-Δ$^4$-pregnene - 11β,17α,21-triol-3,20-dione,
- 57. 19-ethylidene-16α,17α-isopropylidenedioxy - Δ$^4$-pregnene-11β,21-diol-3,20-dione,
- 58. 19-ethylidene-Δ$^4$-pregnene-11β,17α,21 - triol - 3,20-dione,
- 59. 19-ethylidene-16α-methyl-Δ$^4$-pregnene - 11β,17α,21-triol-3,20-dione,
- 60. 19-ethylidene-16β-methyl-Δ$^4$-pregnene - 11β,17α,21-triol-3,20-dione,
- 61. 19-methylene-16α,17α - isopropylidenedioxy - Δ$^4$-pregnen-21-ol-3,11,20-trione,
- 62. 19-methylene-Δ$^4$-pregnene-17α,21-diol - 3,11,20-trione,
- 63. 19-methylene-16α-methyl-Δ$^4$-pregnene - 17α,21-diol-3,11,20-trione,
- 64. 19-methylene-16β-methyl-Δ$^4$ - pregnene - 17α,21-diol-3,11,20-trione,
- 65. 19-ethylidene-16α,17α-isopropylidenedioxy - Δ$^4$-pregnen-21-ol-3,11,20-trione,
- 66. 19-ethylidene-Δ$^4$-pregnene-17α,21-diol - 3,11,20-trione,
- 67. 19-ethylidene-16α-methyl-Δ$^4$-pregnene - 17α,21-diol-3,11,20-trione,
- 68. 19-ethylidene-16β-methyl-Δ$^4$-pregnene - 17α,21-diol-3,11,20-trione.

*Example VIII*

A mixture of 1 g. of 19-methylene-16α,17α-isopropylidenedioxy-Δ$^4$-pregnene-11β,21-diol-3,20-dione (Cpd. No. 53), 4 cc. of pyridine and 2 cc. of propionic anhydride was kept at room temperature overnight, poured into ice water, the formed precipitate was filtered, washed with water and dried. Crystallization with acetone, hexane gave 19-methylene-16α,17α-isopropylidenedioxy-Δ$^4$-pregnene-11β,21-diol-3,20-dione 21-propionate (Cpd. No. 69).

Following the same procedure there were treated the compounds Nos. 54 to 68, inclusive, to produce the corresponding 21-propionates.

*Example IX*

To a solution of 5 g. of 19-methylene-Δ$^4$-pregnen-71α-ol-3,20-dione (Cpd. No. 19) in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-methylene-Δ$^4$-pregnen-17α-ol-3,20-dione acetate (Cpd. No. 70).

Following the same procedure there were treated the compounds Nos. 20, 21, 26, 27 and 28 thus furnishing respectively Cpd. No.:
- 71. 19-methylene-16α-methyl-Δ$^4$-pregnen - 17α-ol-3,20-dione acetate, 72. 19-methylene-16β-methyl-Δ⁴-pregnen - 17α-ol-3, 20-dione acetate,
73. 19-ethylidene-Δ⁴-pregnen-17α-ol - 3,20 - dione acetate.
74. 19-ethylidene-16α-methyl-Δ⁴-pregnen - 17α-ol-3, 20-dione acetate,
75. 19-ethylidene-16β-methyl-Δ⁴-pregnen - 17α-ol-3, 20-dione acetate.

*Example X*

1 g. of 19-methylene-16α,17α-isopropylidenedioxy-Δ⁴-pregnene-3,20-dione (Cpd. No. 18) was heated on the steam bath with 100 cc. of 80% acetic acid under nitrogen for 7 hours, it was then concentrated under vacuum to a small volume and poured into water. The precipitate was collected, washed well with water, dried and crystallized from acetone-hexane, thus furnishing 19-methylene-Δ⁴-pregnene-16α,17α-diol-3,20-dione (Cpd. No 76).

The compounds Nos. 25, 53, 57, 61 and 65 were treated by the same procedure, thus yielding respectively Cpd. No.:
77. 19-ethylidene-Δ⁴-pregnene-16α,17α - diol - 3,20-dione,
78. 19-methylene-Δ⁴-pregnene-11β,16α,17α,21 - tetrol-3,20-dione,
79. 19-ethylidene-Δ⁴-pregnene-11β,16α,17α,21 - tetrol-3,20-dione,
80. 19-methylene-Δ⁴-pregnene-16α,17α,21 - triol - 3, 11,20-trione,
81. 19-ethylidene-Δ⁴-pregnene-16α,17α,21-triol-3,11, 20-trione.

*Example XI*

The compounds Nos. 76 and 79 were treated in accordance with Example VIII, thus yielding respectively 19-methylene-Δ⁴-pregnene-16α,17α-diol-3,20 - dione 16-propionate (Cpd. No. 82) and 19-ethylidene-Δ⁴-pregnene-11β,16α,17α,21-tetrol-3,20 - dione 16,21 - dipropionate (Cpd. No. 83).

*Example XII*

The compounds Nos. 76 and 77, were treated in accordance with Example VIII thus affording respectively: 19-methylene-Δ⁴-pregnene-16α,17α-diol-3,20-dione diacetate (Cpd. No. 84) and 19-ethylidene-Δ⁴-pregnene-16α,17α-diol-3, 20-dione diacetate (Cpd. No. 85).

*Example XIII*

A suspension of 14.5 g. of triphenylphosphonium methyl bromide in 250 cc. of anhydrous ether was treated; under an atmosphere of nitrogen, with 40 cc. of a 1 N ethereal solution of butyl lithium and the mixture was stirred for 2 hours at room temperature. A solution of 5 g. of 3,20-bis-cycloethylenedioxy-Δ⁵-10α-pregnen-19-al in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and crystallization of the solid eluates from acetone-hexane gave 3,20-bis-cycloethylenedioxy-19-methylene-Δ⁵-10α-pregnene (compound No. 86).

The starting compounds listed under I (which were obtained in accordance with preparation 1) were treated by the same procedure thus affording the corresponding products set forth under II.

| I | Compound No. | II |
|---|---|---|
| 3,20-bis-cycloethylenedioxy-16α-methyl-Δ⁵-10α-pregnen-19-al. | 87 | 3,20-bis-cycloethylenedioxy-19-methylene-16α-methyl-Δ⁵-10α-pregnene. |
| 3,20-bis-cycloethylenedioxy-16α-methyl-Δ⁵-10α-pregnen-19-al. | 88 | 3,20-bis-cycloethylenedioxy-19-methylene-16β-methyl-Δ⁵-10α-pregnene. |
| 3,20-bis-cycloethylenedioxy-16α,17α-isopropylidenedioxy-Δ⁵-10α-pregnen-19-al. | 89 | 3,20-bis-cycloethylenedioxy-19-methylene-16α,17α-isopropylidenedioxy-Δ⁵-10α-pregnene. |
| 3,20-bis-cycloethylenedioxy-Δ⁵-10α-pregnen-17α-ol-19-al. | 90 | 3,20-bis-cycloethylenedioxy-19-methylene-Δ⁴-10α-pregnen-17α-ol. |
| 3,20-bis-cycloethylenedioxy-16α-methyl-Δ⁵-10α-pregnen-17α-ol-19-al. | 91 | 3,20-bis-cycloethylenedioxy-19-methylene-16α-methyl-Δ⁵-10α-pregnen-17α-ol. |
| 3,20-bis-cycloethylenedioxy-16β-methyl-Δ⁵-10α-pregnen-17α-ol-19-al. | 92 | 3,20-bis-cycloethylenedioxy-19-methylene-16β-methyl-Δ⁵-10α-pregnen-17α-ol. |

*Example XIV*

The starting compounds of Example XIII were treated in accordance with the procedure described in that example, except that triphenylphosphonium methyl bromide was substituted by triphenylphosphonium ethyl bromide thus giving respectively the following final products.

Cpd. No.:
93. 3,20-bis-cycloethylenedioxy-19-etthylidene-Δ⁵-10α-pregnene,
94. 3,20-bis-cycloethylenedioxy-19-ethylidene-16α-methyl-Δ⁵-10α-pregnene,
95. 3,20-bis-cycloethylenedioxy-19-ethylidene-16β-methyl-Δ⁵-10α-pregnene,
96. 3,20-bis-cycloethylenedioxy-19-ethylidene-16α,17α-isopropylidenedioxy-Δ⁵-10α-pregnene,
97. 3,20-bis-cycloethylenedioxy-19-ethylidene-Δ⁵-10α-pregnen-17α-ol,
98. 3,20-bis-cycloethylenedioxy-19-ethylidene-16α-methyl-Δ⁵-10α-pregnen-17α-pregnen-17α-ol,
99. 3,20-bis-cycloethylenedioxy-19-ethylidene-16β-methyl-Δ⁵-10α-pregnen-17α-ol.

*Example XV*

A solution of 5 g. of compound No. 86 in 250 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 19-methylene-Δ⁴-10α-pregnene-3,20-dione (Cpd. No. 100).

The compounds Nos. 87 to 99 inclusive, were treated by the same procedure, thus affording respectively Cpd. No.:
101. 19-methylene-16α-methyl-Δ⁴-10α-pregnene-3,20-dione,
102. 19-methylene-16β-methyl-Δ⁴-10α-pregnene-3,20-dione,
103. 19-methylene-16α,17α-isopropylidenedioxy-Δ⁴-10α-pregnene-3,20-dione,
104. 19-methylene-Δ⁴-10α-pregnen-17α-ol-3,20-dione,
105. 19-methylene-16α-methyl-Δ⁴-10α-pregnen-17α-ol-3,20-dione,
106. 19-methylene-16β-methyl-Δ⁴-10α-pregnen-17α-ol-3,20-dione,
107. 19-ethylidene-Δ⁴-10α-pregnene-3,20-dione.
108. 19-ethylidene-16α-methyl-Δ⁴-10α-pregnene-3,20-dione,
109. 19-ethylidene-16β-methyl-Δ⁴-10α-pregnene-3,20-dione
110. 19-ethylidene-16α,17α-isopropylidenedioxy-Δ⁴-10α-pregnene-3,20-dione, 111. 19-ethylidene-$\Delta^4$-10α-pregnen-17α-ol-3,20-dione.
112. 19-ethylidene-16α-methyl-$\Delta^4$-10α-pregnen-17α-ol-3,20-dione,
113. 19-ethylidene-16β-methyl-$\Delta^4$-10α-pregnen-17α-ol-3,20-dione.

*Example XVI*

A cooled solution of 4 g. of 19-methylene-16α,17α-isopropylidenedioxy-$\Delta^4$-10α-pregnene-3,20 - dione (Cpd. No. 103) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative.

This compound was mixed with 80 cc. of acetone and 12 g. of recently fused potassium acetate and the mixture was refluxed for 8 hours, concentrated to small volume, diluted with water and extracted with ethyl acetate; the extract was washed with water, dried over anhydrous sodium sulfate and concentrated until crystallization started. The precipitate was collected and crystallized from methanol-water, thus yielding 19-methylene - 16α,17α - isopropylidenedioxy-$\Delta^4$-10α-pregnen-21-ol-3,20-dione acetate (Cpd. No. 114).

The compounds Nos. 104, 105, 106, 110, 111, 112 and 113 were treated by the same procedure affording respectively Cpd. No.:
    115. 19-methylene-$\Delta^4$-10α-pregnene-17α,21-diol-3,20-dione 21-acetate,
    116. 19-methylene-16α-methyl-$\Delta^4$-10α-pregnene - 17α,21-diol-3,20-dione 21-acetate,
    117. 19-methylene-16β-methyl-$\Delta^4$-10α-pregnene - 17α,21-diol-3,20-dione 21-acetate,
    118. 19-ethylidene-16α,17α-isopropylidenedioxy - $\Delta^4$-10α-pregnen-21-ol-3,20-dione acetate,
    119. 19-ethylidene-$\Delta^4$-10α-pregnene-17α,21-diol-3,20-dione 21-acetate,
    120. 19-ethylidene-16α-methyl-$\Delta^4$-10α-pregnene - 17α, 21-diol-3,20-dione 21-acetate,
    121. 19-ethylidene-16β-methyl-$\Delta^4$-10α-pregnene-17α, 21-diol-3,20-dione 21-acetate.

*Example XVII*

The following solutions "A," "B" and "C" were prepared using distilled water as solvent solution "A" was prepared by mixing 425 cc. of a 1.742% dipotassic phosphate solution, ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 10.1% magnesium sulfate, to a volume of lt. solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B and C solutions with vigorous stirring. To the mixture there was then added 1 g. of compound No. 114 dissolved in 5.35 cc. of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. The residue was treated with 2 cc. of acetic anhydride and 4 cc. of pyridine for 8 hours, then the mixture was worked up conventionally, thus affording 19-methylene-16α,17α-isopropylidenedioxy-$\Delta^4$-10α-pregnene-11β,21-diol-3,20-dione 21-acetate (Cpd. No. 122).

The compounds Nos. 115 to 121 inclusive, were treated under the same conditions, thus yielding respectively Cpd. No.:
    123. 19-methylene-$\Delta^4$-10α-pregnene-11β,17α,21-triol-3,20-dione 21-acetate,
    124. 19-methylene-16α-methyl-$\Delta^4$-10α-pregnene-11β, 17α,21-triol-3,20-dione 21-acetate,
    125. 19-methylene-16β-methyl-$\Delta^4$-10α-pregnene-11β, 17α,21-triol-3,20-dione 21-acetate,
    126. 19-ethylidene-16α,17α-isopropylidenedioxy - $\Delta^4$-10α-pregnene-11β,21-diol-3,20-dione 21-acetate,
    127. 19-ethylidene-$\Delta^4$-10α-pregnene-11β,17α,21-triol-3,20-dione 21-acetate,
    128. 19-ethylidene-16α-methyl-$\Delta^4$-10α-pregnene-11β, 17α,21-triol-3,20-dione 21-acetate,
    129. 19-ethylidene-16β-methyl-$\Delta^4$-10α-pregnene - 11β, 17α,21-triol-3,20-dione 21-acetate.

*Example XVIII*

A solution of 1 g. of compound No. 122 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19-methylene-16α,17α-isopropylidenedioxy-$\Delta^4$-10α-pregnen-21-ol - 3,11,20 - trione acetate (Cpd. No. 130).

The compounds Nos. 123 to 129 inclusive, were treated by the same procedure, affording respectively Cpd. No.:
    131. 19-methylene-$\Delta^4$-10α-pregnene-17α,21-diol-3,11,20-trione 21-acetate,
    132. 19-methylene-16α-methyl-$\Delta^4$-10α-pregnene-17α,21-diol-3,11,20-trione 21-acetate,
    133. 19-methylene-16β-methyl-$\Delta^4$-10α-pregnene-17α,21-diol-3,11,20-trione 21-acetate,
    134. 19-ethylidene-16α,17α-isopropylidenedioxy-$\Delta^4$-10α-pregnen-21-ol-3,11,20-trione acetate,
    135. 19-ethylidene-$\Delta^4$-10α-pregnene-17α,21-diol-3,11,20-trione 21-acetate,
    136. 19-ethylidene-16α-methyl-$\Delta^4$-10α-pregnene-17α,21-diol-3,11,20-trione 21-acetate,
    137. 19-ethylidene-16β-methyl-$\Delta^4$-10α-pregnene-17α,21-diol-3,11,20-trione 21-acetate.

*Example XIX*

A suspension of 1 g. of 19-methylene-16α,17α-isopropylidenedioxy-$\Delta^4$-10α-pregnene-11β,21-diol-3,20-dione 21-acetate (Cpd. No. 122) in 60 cc. of methanol was treated with solution of 1 g. of potassium carbonate in 6 cc. of water; the mixture was boiled under reflux for 1 hour and then cooled in ice and diluted with water. The formed precipitate was collected and recrystallized from acetone-hexane to yield 19-methylene-16α,17α-isopropylidenedioxy-$\Delta^4$-10α-pregnene-11β,21-diol-3,20-dione (Cpd. No. 138).

Following the same procedure there were treated the compounds Nos. 123 to 137 inclusive, thus furnishing respectively Cpd. No.:
    139. 19-methylene-$\Delta^4$-10α-pregnene-11β,17α,21-triol-3,20-dione,
    140. 19-methylene-16α-methyl-$\Delta^4$-10α-pregnene-11β,17α,21-triol-3,20-dione, 141. 19-methylene-16β-methyl-Δ⁴-10α-pregnene-11β,17α,21-triol-3,20-dione,
142. 19-ethylidene-16α,17α-isopropylidenedioxy-Δ⁴-10α-pregnene-11β,21-diol-3,20-dione,
143. 19-ethylidene-Δ⁴-10α-pregnene-11β,17α,21-triol-3,20-dione,
144. 19-ethylidene-16α-methyl-Δ⁴-10α-pregnene-11β,17α-21-triol-3,20-dione,
145. 19-ethylidene-16β-methyl-Δ⁴-10α-pregnene-11β,17α,21-triol-3,20-dione,
146. 19-methylene-16α,17α-isopropylidenedioxy-Δ⁴-10α-pregnen-21-ol-3,11,20-trione,
147. 19-methylene-Δ⁴-10α-pregnene-17α,21-diol-3,11,20-trione,
148. 19-methylene-16α-methyl-Δ⁴-10α-pregnene-17α,21-diol-3,11,20-trione,
149. 19-methylene-16β-methyl-Δ⁴-10α-pregnene-17α,21-diol-3,11,20-trione,
150. 19-ethylidene-16α,17α-isopropylidenedioxy-Δ⁴-10α-pregnen-21-ol-3,11,20-trione,
151. 19-ethylidene-Δ⁴-10α-pregnene-17α,21-diol-3,11,20-trione,
152. 19-ethylidene-16α-methyl-Δ⁴-10α-pregnene-17α,21-diol-3,11,20-trione,
153. 19-ethylidene-16β-methyl-Δ⁴-10α-pregnene-17α,21-diol-3,11,20-trione.

*Example XX*

A mixture of 1 g. of 19-methylene-16α,17α-isopropylidenedioxy-Δ⁴-10α-pregnene-11β,21-diol-3,20-dione (Cpd. No. 138), 4 cc. of pyridine and 2 cc. of propionic anhydride was kept at room temperature overnight, poured into ice water, the formed precipitate was filtered, washed with water and dried. Crystallization from acetone-hexane gave 19-methylene-16α,17α-isopropylidenedioxy-Δ⁴-10α-pregnene-11β,21-diol-3,20-dione 21-propionate (Cpd. No. 154).

Following the same procedure there were treated the compounds Nos. 139 to 153, inclusive, to produce the corresponding 21-propionates.

*Example XXI*

To a solution of 5 g. of 19-methylene-Δ⁴-10α-pregnen-17α-ol-3,20-dione (Cpd. No. 19) in 100 cc. of anhydrous benzene there were added 1 g. of p-toluenesulfonic acid and 100 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-methylene-Δ⁴-10α-pregnen-17α-ol-3,20-dione acetate (Cpd. No. 155).

Following the same procedure there were treated the compounds Nos. 105, 106, 111, 112 and 113 thus furnishing respectively Cpd. No.:
156. 19-methylene-16α-methyl-Δ⁴-10α-pregnen-17α-ol-3,20-dione acetate,
157. 19-methylene-16β-methyl-Δ⁴-10α-pregnen-17α-ol-3,20-dione acetate,
158. 19-ethylidene-Δ⁴-10α-pregnen-17α-ol-3,20-dione acetate,
159. 19-ethylidene-16α-methyl-Δ⁴-10α-pregnen-17α-ol-3,20-dione acetate,
160. 19-ethylidene-16β-methyl-Δ⁴-10α-pregnen-17α-ol-3,20-dione acetate.

*Example XXII*

1 g. of 19-methylene-16α,17α-isopropylidenedioxy-Δ⁴-10α-pregnene-3,20-dione (Cpd. No. 103) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 19-methylene-Δ⁴-10α-pregnene-16α,17α-diol-3,20-dione (Cpd. No. 161). The compounds Nos. 110, 138, 142, 164 and 150 were treated by the same procedure, thus yielding respectively Cpd. No.:

162. 19-ethylidene-Δ⁴-10α-pregnene-16α,17α-diol-3,20-dione,
163. 19-methylene-Δ⁴-10α-pregnene-11β,16α,17α,21-tetrol-3,20-dione,
164. 19-ethylidene-Δ⁴-10α-pregnene-11β,16α,17α,21-tetrol-3,20-dione,
165. 19-methylene-Δ⁴-10α-pregnene-16α,17α,21-triol-3,11,20-trione,
166. 19-ethylidene-Δ⁴-10α-pregnene-16α,17α,21-triol-3,11,20-trione.

*Example XXIII*

The compounds Nos. 161 and 164 were treated in accordance with Example XX, thus yielding respectively 19-methylene-Δ⁴-10α-pregnene-16α,17α-diol-3,20 - dione 16-propionate (Cpd. No. 167) and 19-ethylidene-Δ⁴-10α-pregnene 11β,16α,17α,21-tetrol-3,20-dione 16,21 dipropionate (Cpd. No. 168).

*Example XXIV*

The compounds Nos. 161 and 162 were treated in accordance with Example XXI thus affording respectively: 19-methylene-Δ⁴-10α-pregnene-16α,17α-diol - 3,20 - dione diacetate (Cpd. No. 169) and 19-ethylidene-Δ⁴-10α-pregnene-16α,17α-diol-3,20-dione diacetate (Cpd. No. 170).

*Example XXV*

A mixture of 1 g. of 19-methylene-Δ⁴-10α-pregnene-16α,17α-diol-3,20-dione (Cpd. No. 161), 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-methylene-Δ⁴-10α-pregnene-16α,17α-diol-3,20-dione 16,17-acetophenonide (Cpd. No. 171).

The compounds Nos. 162 and 166 inclusive, were treated by the latter procedure, thus yielding the corresponding 16,17-acetophenonides.

*Example XXVI*

A solution of 500 mg. of 19-ethylidene-Δ⁴-10α-pregnene-11β,16α,17α,21-tetrol-3,20-dione (Cpd. No. 164) in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 19-ethylidene-Δ⁴-10α-pregnene-11β,16α,17α,21-tetrol - 3,20-dione 16,17-acetaldehyde acetal (Cpd. No. 172).

The compounds Nos. 161, 162, 163, 165 and 166 were treated by the same procedure to produce the corresponding 16,17-acetaldehyde acetals.

*Example XXVII*

A mixture of 1 g. of 19-methylene-Δ⁴-pregnene-16α,17α-diol-3,20-dione (Cpd. No. 76), 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-methylene-Δ⁴-pregnene-16α,17α-diol-3,20-dione 16,17-acetophenonide (Cpd. No. 173).

The compounds Nos. 77 to 81, inclusive, were treated by the latter procedure, thus yielding the corresponding 16,17-acetophenonides.

*Example XXVIII*

A solution of 500 mg. of 19-ethylidene-Δ⁴-pregnene-11β,16α,17α,21-tetrol-3,20-dione (Cpd. No. 79) in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 19-ethylidene-Δ⁴-pregnene-11β,16α,17α,21 - tetrol - 3,20-dione-16,17-acetaldehyde acetal (Cpd. No. 714).

The compounds Nos. 76, 77, 78, 80 and 81 were treated by the same procedure to produce the corresponding 16,17-acetaldehyde acetals.

I claim:

1. A compound of the following formula:

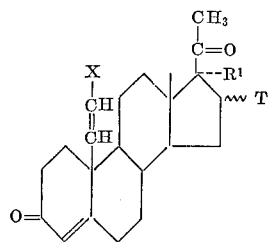

wherein R¹ is selected from the group consisting of hydrogen, hydroxyl and a hydrocarbon carboxylic acyloxy group of less than 12 carbon atoms; T is a member of the group consisting of hydrogen, α-hydroxy, α-hydrocarbon carboxylic acyloxy of less than 12 carbon atoms, α-methyl and β-methyl; T and R¹ together are the group

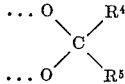

wherein R⁴ and R⁵ each is a lower alkyl group; and X is a member of the group consisting of hydrogen and a lower alkyl group.

2. 19-methylene-Δ⁴-pregnene-3,20-dione.
3. 19-ethylidene-Δ⁴-pregnene-3,20-dione.
4. 19-ethylene-Δ⁴-pregnen-17α-ol-3,20-dione.
5. 19-ethylidene-Δ⁴-pregnen-17α-ol-33,20-dione.
6. 19 - methylene - 16α,17α-isopropylidenedioxy-Δ⁴-pregnene-3,20-dione.
7. 19 - ethylidene - 16α,17α - isopropylidenedioxy-Δ⁴-pregnene-3,20-dione.
8. 19 - methylene - 16α-methyl-Δ⁴-pregnen-17α-ol-3,20-dione.
9. 19 - methylene - 16β-methyl-Δ⁴-pregnen-17α-ol-3,20-dione.
10. 19 - ethylidene - 16α-methyl-Δ⁴-pregnen-17a-ol-3,20-dione.
11. 19 - ethylidene - 16β-methyl-Δ⁴-pregnen-17α-ol-3,20-dione.

12. A compound of the following formula

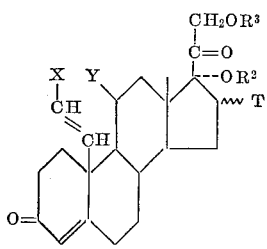

wherein R² is hydrogen; T is a member of the group consisting of hydrogen, α-hydroxyl, α-hydrocarbon carboxylic acyloxy of less than 12 carbon atoms, α-methyl and β-methyl; OR² and T together are the group

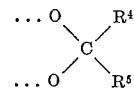

wherein R⁴ and R⁵ each is a lower alkyl group; Y is selected from the group consisting of β-hydroxyl and keto; X is selected from the group consisting of hydrogen and a lower alkyl group and R³ is selected from the group consisting of hydrogen and a hydrocarbon carboxylic acyl group of less than 12 carbon atoms.

13. 19 - methylene-Δ⁴-pregnane-11β,17α,21-triol-3,20-dione 21-acetate.
14. 19 - ethylidene - Δ⁴-pregnene-11β,17α,21-triol-3,20-dione 21-acetate.
15. 19 - methylene - 16α,17α-isopropylidenedioxy-Δ⁴-pregnene-11β,21-diol-3,20-dione 21-acetate.
16. 19 - ethylidene - 16α,17α-isopropylidenedioxy-Δ⁴-pregnene-11β,21-diol-3,20-dione 21-acetate.
17. 19 - methylene - Δ⁴-pregnene-17α,21-diol-3,11,20-trione 21-acetate.
18. 19 - ethylidene - Δ⁴-pregnene-17α,21-diol-3,11,20-trione 21-acetate.
19. 19 - methylene - 16α,17α-isopropylidenedioxy-Δ⁴-pregnene-21-ol-3,11,20-trione acetate.
20. 19 - ethylidene - 16α,17α-isopropylidenedioxy-Δ⁴-pregnen-21,-ol-3,11,20-trione acetate.

21. A compound of the following formula:

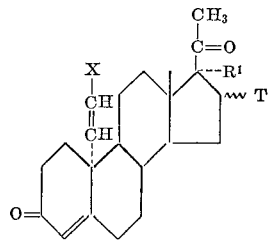

wherein R¹ is selected from the group consisting of hydrogen, hydroxyl and a hydrocarbon carboxylic acyloxy group of less than 12 carbon atoms; T is a member of the group consisting of hydrogen, α-hydroxy, α-hydrocarbon carboxylic acyloxy of less than 12 carbon atoms, α-methyl and β-methyl; T and R¹ together are the group

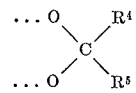

wherein R⁴ and R⁵ are selected from the group consisting of hydrogen and a lower hydrocarbon residue of up to 8 carbon atoms, and X is a member of the group consisting of hydrogen and a lower alkyl group.

22. 19-methylene-Δ⁴-10α-pregnene-3,20-dione.
23. 19-ethylidene-Δ⁴-10α-pregnene-3,20-dione.
24. 19-methylene-Δ⁴-10α-pregnen-17α-ol-3,20-dione.
25. 19-ethylidene-Δ⁴-10α-pregnen-17α-ol-3,20-dione.
26. 19-methylene-16α,17α-isopropylidenedioxy-Δ⁴-10α-pregnene-3,20-dione.
27. 19-ethylidene-16α,17α-isopropylidenedioxy-Δ⁴-10α-pregnene-3,20-dione.
28. 19-methylene-16α-methyl-Δ⁴-10α-pregnen-17α-ol-3,20-dione.
29. 19 - methylene - 16β - methyl - Δ⁴ - 10α - pregnen-17α-ol-3,20-dione.
30. 19 - ethylidene - 16α - methyl - Δ⁴ - 10α - pregnen-17α-ol-3,20-dione.

31. 19 - ethylidene - 16β - methyl - Δ⁴ - 10α - pregnen-17α-ol-3,20-dione.

32. A compound of the following formula:

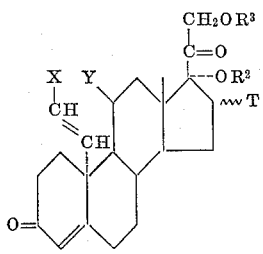

wherein R² is hydrogen; T is a member of the group consisting of hydrogen, α-hydroxyl, α-hydrocarbon carboxylic acyloxy of less than 12 carbon atoms, α-methyl and β-methyl OR² and T together are the group

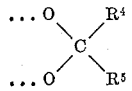

wherein R⁴ and R⁵ are selected from the group consisting of hydrogen and a lower hydrocarbon residue of up to 8 carbon atoms; Y is selected from the group consisting of β-hydroxyl and keto; X is selected from the group consisting of hydrogen and a lower alkyl group and R³ is selected from the group consisting of hydrogen and a hydrocarbon carboxylic acyl group of less than 12 carbon atoms.

33. 19 - methylene - Δ⁴ - 10α - pregnene - 11β,17α,21-triol-3,20-dione 21-acetate.

34. 19 - ethylidene - Δ⁴ - 10α - pregnene - 11β,17α,21-triol-3,20-dione 21-acetate.

35. 19 - methylene - 16α,17α - isopropylidenedioxy-Δ⁴-10α-pregnene-11β,21-diol-3,20-dione 21-acetate.

36. 19 - ethylidene - 16α,17α - isopropylidenedioxy-Δ⁴-10α-pregnene-11β,21-diol-3,20-dione 21-acetate.

37. 19 - methylene - Δ⁴ - 10α - pregnene - 17α,21-diol-3,11,20-trione 21- acetate.

38. 19 - ethylidene - Δ⁴ - 10α - pregnene - 17α,21-diol-3,11,20-trione 21-acetate.

39. 19 - methylene - 16α,17α - isopropylidenedioxy-Δ⁴-10α-pregnen-21-ol-3,11,20-trione acetate.

40. 19 - ethylidene - 16α,17α - isopropylidenedioxy-Δ⁴-10α-pregnen-21-ol-3,11,20-trione acetate.

No references cited.

LEWIS GOTTS, *Primary Examiner.*

THOMAS M. MESHBESHER, *Assistant Examiner.*